US009704267B2

(12) United States Patent
Kim et al.

(10) Patent No.: US 9,704,267 B2
(45) Date of Patent: Jul. 11, 2017

(54) INTERACTIVE CONTENT CONTROL APPARATUS AND METHOD

(71) Applicant: ELECTRONICS AND TELECOMMUNICATIONS RESEARCH INSTITUTE, Daejeon (KR)

(72) Inventors: Hang-Kee Kim, Daejeon (KR); Ki-Hong Kim, Sejong (KR); Hong-Kee Kim, Daejeon (KR); Woo-Jin Jeon, Jeonju-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 49 days.

(21) Appl. No.: 14/837,181

(22) Filed: Aug. 27, 2015

(65) Prior Publication Data
US 2016/0366396 A1 Dec. 15, 2016

(30) Foreign Application Priority Data

Jun. 15, 2015 (KR) .................. 10-2015-0084307

(51) Int. Cl.
*G06T 7/00* (2017.01)
*G06T 15/10* (2011.01)
(Continued)

(52) U.S. Cl.
CPC ............. *G06T 7/536* (2017.01); *G06T 7/70* (2017.01); *G06T 13/20* (2013.01); *G06T 15/10* (2013.01)

(58) Field of Classification Search
CPC G06T 7/536; G06T 7/70; G06T 13/20; G06T 15/10
See application file for complete search history.

(56) References Cited

U.S. PATENT DOCUMENTS 6,842,175 B1 * 1/2005 Schmalstieg ........... G06F 3/011
345/427
9,329,469 B2 * 5/2016 Benko .................... G03B 35/00
(Continued)

FOREIGN PATENT DOCUMENTS

| KR | 10-2012-0050118 A | 5/2012 |
|----|-------------------|--------|
| KR | 10-1204868 B1 | 11/2012 |
| KR | 10-2015-0000911 A | 1/2015 |

OTHER PUBLICATIONS

Angus et al., "Embedding the 2D interaction metaphor in a real 3D virtual environment", 1995, Proc. SPIE 2409, Stereoscopic Displays and Virtual Reality Systems II, 282-293.*
(Continued)

*Primary Examiner* — Katrina Fujita
(74) *Attorney, Agent, or Firm* — LRK Patent Law Firm

(57) ABSTRACT

An interactive content control apparatus and method includes a depth information acquisition unit for acquiring an image that includes depth information by capturing a static background object and a dynamic foreground object, and for calculating depth maps based on respective depth values of the static background object and the dynamic foreground object from the image, a display unit for projecting image content including a background image and an object image on a surface of the static background object captured by the depth information acquisition unit, and an image mapping unit for recognizing the dynamic foreground object depending on the depth maps based on the depth values calculated by the depth information acquisition unit, and controlling the display unit so that an object image projected on the surface of the static background object is transferred to and projected on a surface of the dynamic foreground object.

16 Claims, 10 Drawing Sheets

(51) Int. Cl.
*G06T 13/20* (2011.01)
*G06T 7/536* (2017.01)
*G06T 7/70* (2017.01)

(56) References Cited

U.S. PATENT DOCUMENTS

| | | | | |
|---|---|---|---|---|
| 9,509,981 B2* | 11/2016 | Wilson | | G06F 3/011 |
| 2001/0044858 A1* | 11/2001 | Rekimoto | | G06F 3/011 |
| | | | | 710/1 |
| 2002/0113778 A1* | 8/2002 | Rekimoto | | G06F 3/046 |
| | | | | 345/173 |
| 2003/0034974 A1* | 2/2003 | Welch | | G06T 13/20 |
| | | | | 345/426 |
| 2003/0043152 A1* | 3/2003 | Raskar | | G06T 13/20 |
| | | | | 345/473 |
| 2005/0248566 A1* | 11/2005 | Vesely | | G06T 15/10 |
| | | | | 345/419 |
| 2006/0126927 A1* | 6/2006 | Vesely | | G06F 3/011 |
| | | | | 382/154 |
| 2009/0313584 A1* | 12/2009 | Kerr | | G06F 3/012 |
| | | | | 715/849 |
| 2011/0119631 A1* | 5/2011 | Cho | | G06F 1/1626 |
| | | | | 715/848 |
| 2012/0057006 A1* | 3/2012 | Joseph | | H04N 13/0495 |
| | | | | 348/59 |
| 2012/0115555 A1 | 5/2012 | Cho et al. | | |
| 2012/0188637 A1* | 7/2012 | Joseph | | G02B 27/2278 |
| | | | | 359/478 |
| 2012/0212509 A1* | 8/2012 | Benko | | G03B 35/00 |
| | | | | 345/633 |
| 2013/0225305 A1* | 8/2013 | Yang | | A63F 13/00 |
| | | | | 473/152 |
| 2013/0235085 A1 | 9/2013 | Kim et al. | | |
| 2014/0118336 A1* | 5/2014 | Smithwick | | G02B 27/2214 |
| | | | | 345/419 |
| 2014/0129990 A1* | 5/2014 | Xin | | G06F 3/017 |
| | | | | 715/849 |
| 2014/0143672 A1 | 5/2014 | Kim et al. | | |
| 2014/0205146 A1* | 7/2014 | Holz | | G06T 7/2046 |
| | | | | 382/103 |
| 2014/0253692 A1 | 9/2014 | Wilson et al. | | |
| 2014/0306875 A1* | 10/2014 | He | | G06F 3/017 |
| | | | | 345/156 |
| 2014/0310640 A1* | 10/2014 | Kim | | G06T 11/001 |
| | | | | 715/780 |
| 2014/0354602 A1* | 12/2014 | He | | G06F 3/017 |
| | | | | 345/175 |
| 2015/0193964 A1* | 7/2015 | Kim | | G06T 15/10 |
| | | | | 345/423 |
| 2015/0262426 A1* | 9/2015 | Marner | | G06F 3/011 |
| | | | | 345/419 |
| 2015/0279042 A1* | 10/2015 | Michot | | G06T 5/005 |
| | | | | 382/154 |

OTHER PUBLICATIONS

Dias et al., "Gesturing with Tangible Interfaces for Mixed Reality", GW 2003: Gesture-Based Communication in Human-Computer Interaction, 399-408.*

Kato et al., "Virtual object manipulation on a table-top AR environment", 2000, Proceedings IEEE and ACM International Symposium on Augmented Reality, 112-119.*

Prince et al., "3D live: real time captured content for mixed reality", 2002, Proceedings. International Symposium on Mixed and Augmented Reality.*

* cited by examiner

INTERACTIVE CONTENT CONTROL APPARATUS AND METHOD

CROSS REFERENCE TO RELATED APPLICATION

This application claims the benefit of Korean Patent Application No. 10-2015-0084307, filed Jun. 15, 2015, which is hereby incorporated by reference in its entirety into this application.

BACKGROUND OF THE INVENTION

1. Technical Field

The present invention generally relates to an interactive content control apparatus and method, and more particularly, to an interactive content control apparatus and method, which recognize and track a dynamic foreground object that is moving in the foreground direction of a static background object based on a depth map, transfer an object image, projected on the surface of the static background object, to the surface of the moving dynamic foreground object, and project the object image on the surface of the moving dynamic foreground object, and which change the animation effect of the object image or control the content of a background image.

2. Description of the Related Art

To control multimedia content such as image content, it is general to use a keyboard, a mouse or a joystick as an input device, and use a monitor or a beam projector as an output device.

Recently, to control multimedia content, various hardware devices capable of overcoming the limitations of conventional input devices, such as a keyboard, a mouse or a joystick, have been released. Such improved input devices may directly recognize the inherent behavior of a human being using various sensors, such as a camera, an acceleration sensor, an infrared sensor, and a gyroscope, as well as conventional simple input devices such as a keyboard, a mouse, and a joystick, thus allowing the user to control multimedia content.

Meanwhile, in the field of output devices, with the popularization of inexpensive small-sized beam projectors such as pico-projectors and the installation of small-sized beam projectors in smart mobile devices, a user may carry a beam projector and may easily view images (videos) via the beam projector as long as space suitable for the projection of images (space in which brightness and the shape and material of a screen plane are suitable for projection) is present.

In connection with this, Korean Patent No. 10-1204868 discloses a technology related to "Projector with virtual input interface and Method of inputting data with virtual input interface." (Date of publication: Oct. 15, 2008)

SUMMARY OF THE INVENTION

Accordingly, the present invention has been made keeping in mind the above problems occurring in the prior art, and an object of the present invention is to provide interactive content control technology, which recognize a moving object, track the location and direction of the object in real time, and project an image on the tracked object via projection mapping, and which can change the animation effect or content of an image depending on the movement direction of the moving object.

Another object of the present invention is to provide intuitive interactive content control technology, which recognize a dynamic foreground object that is moving in the foreground direction of a static background object, transfer an object image, among pieces of image content projected on the static background object, to the dynamic foreground object, and project the object image on the dynamic foreground object, and which track the movement of a dynamic foreground object and change the animation effect of the object image projected on the dynamic foreground object or change the content of a background image, thus allowing a user to control both the object image and the background image merely by moving the dynamic foreground object.

In accordance with an aspect of the present invention to accomplish the above objects, there is provided an interactive content control apparatus, including a depth information acquisition unit for acquiring an image that includes depth information by capturing a static background object and a dynamic foreground object, and for calculating depth maps based on respective depth values of the static background object and the dynamic foreground object from the image; a display unit for projecting image content including both a background image and an object image on a surface of the static background object captured by the depth information acquisition unit; and an image mapping unit for recognizing the dynamic foreground object depending on the depth maps based on the depth values calculated by the depth information acquisition unit, and controlling the display unit so that an object image projected on the surface of the static background object is transferred to and projected on a surface of the dynamic foreground object.

The image mapping unit may include an object image bounding volume management unit for setting and managing an object image bounding volume including the object image in a foreground direction of the object image projected on the static background object; and a foreground/background processing unit for, if, depending on the depth maps based on the depth values calculated by the depth information acquisition unit, the dynamic foreground object is determined to collide with the object image bounding volume, controlling the display unit so that the object image projected on the surface of the static background object is transferred to and projected on the surface of the dynamic foreground object.

The foreground/background processing unit may include a foreground object recognition unit for recognizing a location and movement direction of a dynamic foreground object present in the foreground direction of the static background object, depending on the depth maps based on the depth values calculated by the depth information acquisition unit; a foreground object bounding volume setting unit for setting a foreground object bounding volume including the dynamic foreground object recognized by the foreground object recognition unit; a bounding volume collision determination unit for, if the object image bounding volume and the foreground object bounding volume overlap each other by a preset threshold or more, and if the movement direction of the dynamic foreground object is the foreground direction, determining that the dynamic foreground object collides with the object image bounding volume; and a foreground/background switching unit for, if it is determined by the bounding volume collision determination unit that the dynamic foreground object collides with the object image bounding volume, controlling the display unit so that the object image projected on the surface of the static background object is transferred to and projected on the surface of the dynamic foreground object.

The foreground object recognition unit may be configured to previously acquire a depth map based on a depth value of the static background object obtained when no dynamic foreground object is present, and is configured to, if depth values that differ from the depth value of the static background object by a preset threshold or more are calculated by the depth information acquisition unit, classify depth values, grouped for neighboring depth values, among the depth values, as individual blobs, and recognize a location and a movement direction of the dynamic foreground object only when a size of each blob falls within a preset range.

The foreground object recognition unit may set a width corresponding to a preset range in an outer region of the depth map based on the depth value of the static background object obtained when no dynamic foreground object is present, and exclude a blob if the blob extends into the width.

The foreground/background switching unit may be configured to, if it is recognized by the foreground object recognition unit that the dynamic foreground object deviates from the foreground direction of the static background object, control the display unit so that the object image transferred to and projected on the surface of the dynamic foreground object is projected on the surface of the static background object.

The image mapping unit may further include an event processing unit configured to, when the dynamic foreground object is moved, change an animation effect of the object image transferred to and projected on the surface of the dynamic foreground object, or change content of the background image projected on the surface of the static background object, depending on the depth maps based on the depth values calculated by the depth information acquisition unit.

The event processing unit may include a foreground object tracking unit for tracking a location and a movement direction of the dynamic foreground object present in the foreground direction of the static background object, depending on the depth maps based on the depth values calculated by the depth information acquisition unit; and an object image animation processing unit for, as the dynamic foreground object tracked by the foreground object tracking unit is moved, changing the animation effect of the object image transferred to and projected on the surface of the dynamic foreground object.

The event processing unit may further include a background image content processing unit for, as the dynamic foreground object tracked by the foreground object tracking unit is moved, changing the content of the background image projected on the surface of the static background object.

The image mapping unit may further include a preprocessing unit for calculating an extrinsic parameter of the depth information acquisition unit and an intrinsic parameter of the display unit, generating relative location and direction information, and performing calibration between the depth information acquisition unit and the display unit.

In accordance with another aspect of the present invention to accomplish the above objects, there is provided an interactive content control method, including acquiring, by a depth information acquisition unit, an image that includes depth information by capturing a static background object, and calculating a depth map based on a depth value of the static background object from the image; projecting, by an image mapping unit, image content including both a background image and an object image on a surface of the static background object depending on the depth map by controlling a display unit, the depth map being based on the depth value of the static background object calculated by a depth information acquisition unit; acquiring, by the depth information acquisition unit, an image that includes depth information by capturing a dynamic foreground object, and calculating a depth map based on a depth value of the dynamic foreground object from the image; and recognizing, by the image mapping unit, the dynamic foreground object depending on the depth map based on the depth value of the dynamic foreground object calculated by the depth information acquisition unit, and transferring and projecting the object image projected on the surface of the static background object to and on a surface of the dynamic foreground object by controlling the display unit.

Transferring and projecting the object image projected on the surface of the static background object to and on the surface of the dynamic foreground object may include setting and managing, by an object image bounding volume management unit, an object image bounding volume including the object image in a foreground direction of the object image projected on the static background object; and transferring and projecting the object image projected on the surface of the static background object to and on the surface of the dynamic foreground object by controlling the display unit if, depending on the depth maps based on the depth values calculated by the depth information acquisition unit, the dynamic foreground object is determined to collide with the object image bounding volume.

Transferring and projecting the object image projected on the surface of the static background object to and on the surface of the dynamic foreground object if the dynamic foreground object is determined to collide with the object image bounding volume, may include recognizing, by a foreground object recognition unit, recognizing a location and a movement direction of the dynamic foreground object present in the foreground direction of the static background object depending on the depth maps based on the depth values calculated by the depth information acquisition unit; setting, by a foreground object bounding volume setting unit, a foreground object bounding volume including the dynamic foreground object recognized by the foreground object recognition unit; if the object image bounding volume and the foreground object bounding volume overlap each other by a preset threshold or more, and if the movement direction of the dynamic foreground object is the foreground direction, determining that the dynamic foreground object collides with the object image bounding volume; and if it is determined by the bounding volume collision determination unit that the dynamic foreground object collides with the object image bounding volume, transferring and projecting, by a foreground/background switching unit, the object image projected on the surface of the static background object to and on the surface of the dynamic foreground object, by controlling the display unit.

Recognizing the location and movement direction of the dynamic foreground object present in the foreground direction of the static background object may include previously acquiring a depth map based on a depth value of the static background object obtained when no dynamic foreground object is present; and if depth values that differ from the depth value of the static background object by a preset threshold or more are calculated by the depth information acquisition unit, classifying depth values, grouped for neighboring depth values, among the depth values, as individual blobs, and recognizing a location and a movement direction of the dynamic foreground object only when a size of each blob falls within a preset range.

Recognizing the location and movement direction of the dynamic foreground object present in the foreground direction of the static background object may further include setting a width corresponding to a preset range in an outer region of the depth map based on the depth value of the static background object obtained when no dynamic foreground object is present, and excluding a blob if the blob extends into the width.

Transferring and projecting the object image projected on the surface of the static background object to and on the surface of the dynamic foreground object if it is determined by the bounding volume collision determination unit that the dynamic foreground object collides with the object image bounding volume, may include, if it is recognized by the foreground object recognition unit that the dynamic foreground object deviates from the foreground direction of the static background object upon recognizing the location and movement direction of the dynamic foreground object, controlling the display unit so that the object image transferred to and projected on the surface of the dynamic foreground object is projected on the surface of the static background object.

The interactive content control method may further include changing, by an event processing unit, an animation effect of the object image transferred to and projected on the surface of the dynamic foreground object, or changing content of the background image projected on the surface of the static background object when the dynamic foreground object is moved, depending on the depth maps based on the depth values calculated by the depth information acquisition unit.

Changing the animation effect of the object image transferred to and projected on the surface of the dynamic foreground object, or changing the content of the background image projected on the surface of the static background object may include tracking, by a foreground object tracking unit, a location and a movement direction of the dynamic foreground object present in the foreground direction of the static background object, depending on the depth maps based on the depth values calculated by the depth information acquisition unit; and as the dynamic foreground object tracked by the foreground object tracking unit is moved, changing, by an object image animation processing unit, the animation effect of the object image transferred to and projected on the surface of the dynamic foreground object.

Changing the animation effect of the object image transferred to and projected on the surface of the dynamic foreground object, or changing the content of the background image projected on the surface of the static background object may further include as the dynamic foreground object tracked by the foreground object tracking unit is moved, changing, by a background image content processing unit, the content of the background image projected on the surface of the static background object.

The interactive content control method may further include, before acquiring the image including depth information by capturing the static background object, and calculating the depth map based on the depth value of the static background object from the image, calculating, by a preprocessing unit, an extrinsic parameter of the depth information acquisition unit and an intrinsic parameter of the display unit, generating relative location and direction information, and performing calibration between the depth information acquisition unit and the display unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
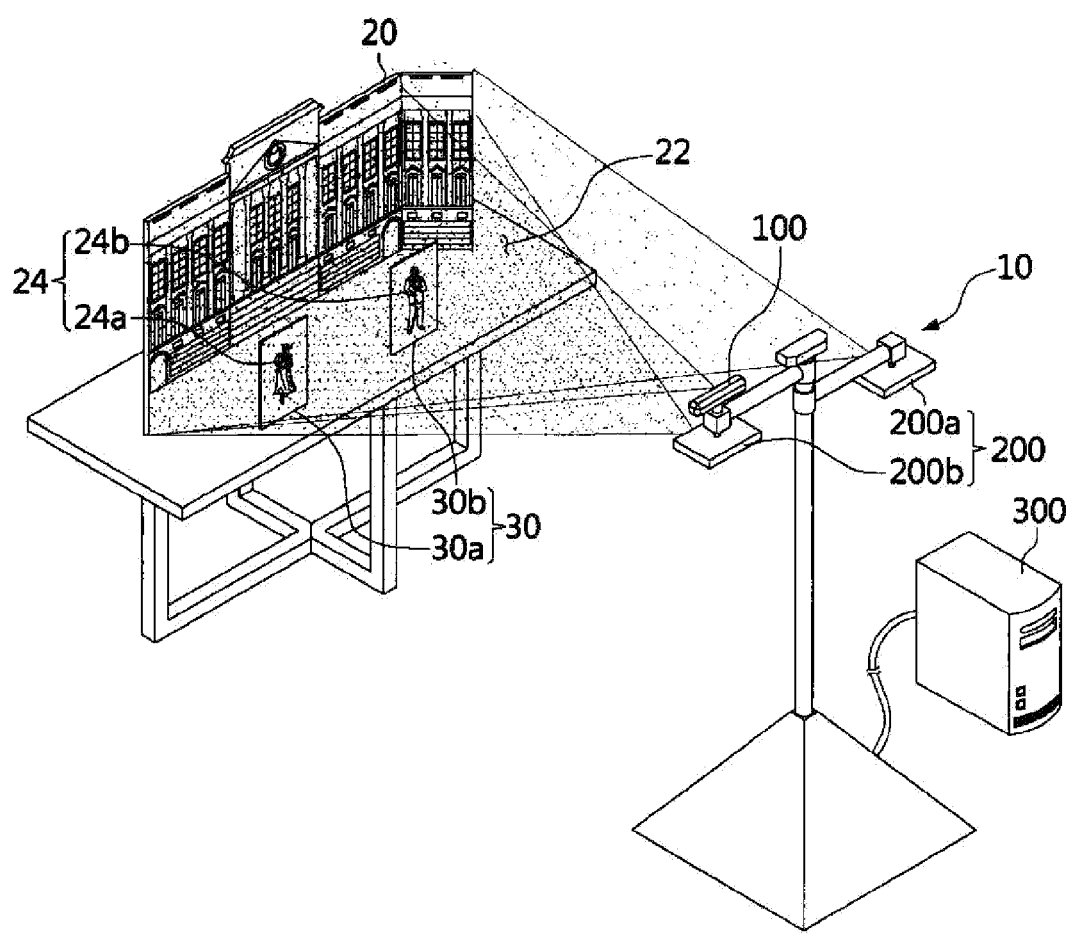
FIG. 1 is a diagram showing the configuration and operating concept of an interactive content control apparatus according to the present invention.

The present invention will be described in detail below with reference to the accompanying drawings. Repeated descriptions, as well as descriptions of known functions and configurations which have been deemed to make the gist of the present invention unnecessarily obscure, will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, the configuration and operation of an interactive content control apparatus according to the present invention will be described in detail with reference to the attached drawings.

FIG. 1 is a diagram showing the configuration and operating concept of an interactive content control apparatus according to the present invention.

Referring to FIG. 1, an interactive content control apparatus 10 according to the present invention includes a depth information acquisition unit 100, a display unit 200, and an image mapping unit 300. The depth information acquisition unit 100 acquires images that include depth information by capturing a static background object 20 and a dynamic foreground object 30, and calculates depth maps based on the respective depth values of the static background object 20 and the dynamic foreground object 30 from the corresponding images. The display unit 200 projects a background image 22, among pieces of image content, on the static background object 20 and projects an object image 24 on the static background object 20 or the dynamic foreground object 30, under the control of the image mapping unit 300. The image mapping unit 300 recognizes the dynamic foreground object 30 using the depth maps based on the depth values calculated by the depth information acquisition unit 100. Further, if the dynamic foreground object 30 is present in the foreground direction of the static background object 20, the image mapping unit 300 controls the display unit 200 so that the object image 24 projected on the surface of the static background object 20 is transferred to and projected on the surface of the recognized dynamic foreground object 30.

The interactive content control apparatus 10 according to the present invention acquires the depth information of the static background object 20 or the dynamic foreground object 30, and then generates a depth map based on the depth values of the static background object 20 or the dynamic foreground object 30. First, when no dynamic foreground object 30 is present in the foreground direction of the static background object 20, that is, the forward direction of the static background object 20 that faces the interactive content control apparatus 10, both the background image 22 and the object image 24 are projected together on the surface of the static background object 20 based on the depth map of the static background object 20. Here, the background image 22 is a basic background image in which image content is played, and preferably undergoes the correction of image distortion and the masking of a contour region prior to being projected on the surface of the static background object 20 via the display unit 200. In contrast, when a dynamic foreground object 30 is present in the foreground direction of the object image 24 projected on the static background object 20, the background image 22 is projected on the surface of the static background object 20, but the object image 24 is transferred to and projected on the surface of the dynamic foreground object 30, based on the depth map of the dynamic foreground object 30. Here, the static background object 20 may have the shape of a panel-type screen fixedly installed on one portion of the sidewall/floor/ceiling of actual space, and may be divided into a portion in which image content is projected and a remaining portion in which image content is not projected and in which a design pattern such as a picture may be formed in advance. Further, the dynamic foreground object 30 may be produced in the form of an atypical plate made of acryl or foam board, which enables the size and appearance thereof to be easily formed in a desired shape, and which is lightweight enough to be conveniently moved by the user. In particular, the dynamic foreground object 30 is preferably produced in the form of a semitransparent acrylic plate or a projection grid having a mesh structure. When the dynamic foreground object 30 is produced as a semitransparent acrylic plate or a projection grid having a mesh structure, the background image 22, located behind the foreground, is visible. Therefore, there is an advantage in that the object image 24, which is transferred to and projected on the surface of the dynamic foreground object 30, and the background image 22, which is projected on the surface of the static background object 20, are naturally combined with each other and are then shown to the user. When the dynamic foreground object 30 is produced as a semitransparent acrylic plate, it allows infrared light (IR) of the information acquisition unit 100 to pass therethrough, and thus it may be difficult to track the dynamic foreground object 30 via the extraction of depth information. Accordingly, the dynamic foreground object 30 may be produced such that a separate marker capable of recognizing the depth is attached to a specific portion thereof, and then the motion of the entire semitransparent plate may be inferred by tracking the corresponding marker. Further, as will be described later with reference to FIGS. 4A, 4B and 4C, the dynamic foreground object 30 may be produced so that it is attached, to a bar-type handle 32 (see FIG. 4C) made of transparent acryl, thus allowing the user to freely move the dynamic foreground object 30. Meanwhile, the image content (background/object images) projected on the static background object 20 and the dynamic foreground object 30 may be still images as well as animation videos (moving images), may include sound information (background music, narrations, sound effects, etc.) suitable for the projected moving images or still images, and may be represented in the format of a render texture material animated on the surface of a depth map-based mesh. Meanwhile, as shown in FIG. 1, the object image 24 (including 24a and 24b) and the dynamic foreground object 30 (30a and 30b) may each include one or more images or one or more objects.

The depth information acquisition unit 100 acquires images that include depth information by capturing the static background object 20 or the dynamic foreground object 30 located in actual space, and generates depth maps based on the depth values of the static background object 20 or the dynamic foreground object 30, depending on the acquired images. More specifically, when no dynamic foreground object 30 is present in the foreground direction of the static background object 20, a depth image of only the static background object 20 is acquired, and is used to generate a depth map based on the depth values. In contrast, when any dynamic foreground object 30 is present in the foreground direction of the static background object 20, depth images of both the static background object 20 and the dynamic foreground object 30 are acquired, and depth maps based on the respective depth values of the static background object 20 and the dynamic foreground object 30 are generated. Here, the depth information acquisition unit 100 may preferably be a single depth camera capable of sensing a depth image of a forward target, such as Kinect or Structure.io. However, a multiview camera for acquiring three-dimensional (3D) information by performing stereo matching of the acquired images may also correspond to the depth image acquisition unit 100. The depth information acquisition unit 100 transmits the calculated depth map information for the static background object 20 or the dynamic foreground object 30 to the image mapping unit 300.

Under the control of the image mapping unit 300, the display unit 200 projects the image content including the background image 22 and the object image 24 on the surface of the static background object 20 captured by the depth information acquisition unit 100, or transfers the object image 24, which is projected on the surface of the static background object 20, to the surface of the dynamic foreground object 30 and projects the object image 24 on the surface of the dynamic foreground object 30. Depending on the circumstances, the display unit 200 may again transfer and project the object image 24, which is projected on the surface of the dynamic foreground object 30, to and on the surface of the static background object 20, under the control of the image mapping unit 300. More specifically, when no dynamic foreground object 30 is present in the foreground direction of the static background object 20, both the background image 22 and the object image 24 are projected on the surface of the static background object 20 under the control of the image mapping unit 300. However, when any dynamic foreground object 30 is located in the foreground direction of the object image 24 projected on the static background object 20, the object image 24 projected on the static background object 20 is transferred to and projected on the dynamic foreground object 30, under the control of the image mapping unit 300. Here, when the dynamic foreground object 30 moves in the foreground direction of the static background object 20, the object image 24 continues to be projected on the surface of the moving dynamic foreground object 30 under the control of the image mapping, unit 300, which tracks the movement of the dynamic foreground object 30. In contrast, when the dynamic foreground object 30 deviates from the foreground direction of the static background object 20 while the object image 24 is projected on the dynamic foreground object 30, the object image 24 is re-transferred from the dynamic foreground object 30 to the static background object 20 and is then re-projected on the static background object 20. Here, the, display unit 200 may have the form of a beam projector, and may include, but is not limited to, two beam projectors, that is, a first beam projector 200a for projecting the background image 22 and a second beam projector 200b for projecting the object image 24, as shown in FIG. 1.

Figure 2:
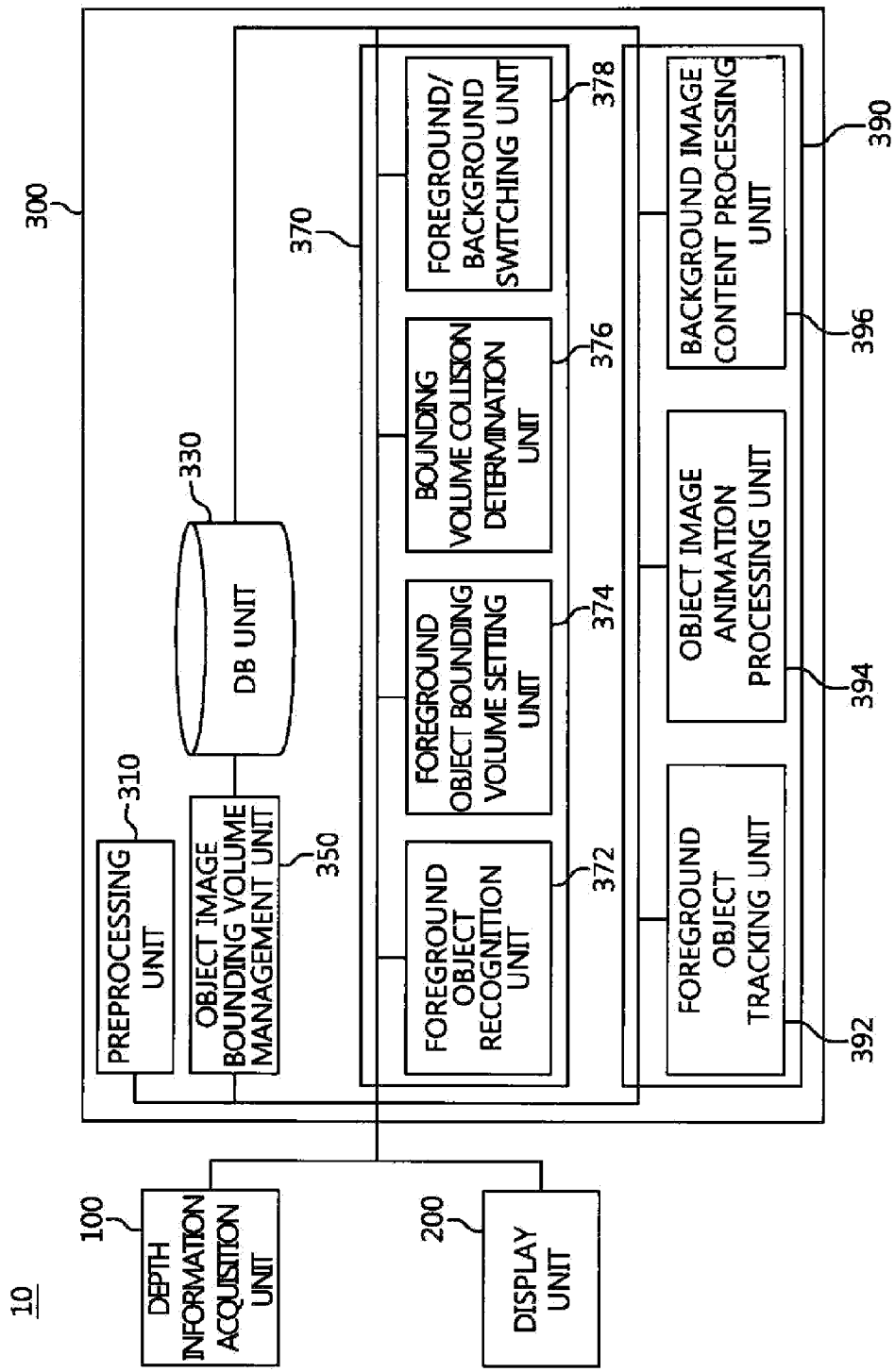
FIG. 2 is a block diagram showing the detailed configuration of the interactive content control apparatus shown in FIG. 1 according to the present invention.

The image mapping unit 300 receives information about depth maps based on the respective depth values of the static background object 20 or the dynamic foreground object 30 calculated by the depth information acquisition unit 100 and determines, based on the received depth map information, whether any dynamic foreground object 30 is present in the foreground direction of the static background object 20 on which the object image 24 is projected. If it is determined that no dynamic foreground object 30 is present in the foreground direction of the object image 24 projected on the static background object 20, the image mapping unit 300 controls the display unit 200 so that the object image 24 continues to be projected on the static background object 20. In contrast, if it is determined that any dynamic foreground object 30 is located in the foreground direction of the object image 24 projected on the static background object 20, the image mapping unit 300 controls the display unit 200 so that the object image 24 projected on the static background object 20 is transferred to and projected on the surface of the dynamic foreground object 30. Further, the image mapping unit 300 tracks the movement of the moving dynamic foreground object 30 until the dynamic foreground object 30 deviates from the foreground direction of the static background object 20, and then controls the display unit 200 so that the object image 24 continues to be projected on the dynamic foreground object 30. Depending on the circumstances, the animation, effect of the object image 24 projected on the dynamic foreground object 30 is changed, or alternatively the content of the background image 22 projected on the surface of the static background object 20 is controlled. As shown in FIG. 2, the image mapping unit 300 includes a preprocessing unit 310, a database (DB) unit 330, an object image bounding volume management unit 350, a foreground/background processing unit 370, and an event processing unit 390.

In order for the display unit 200 to accurately project the background image 22 or the object image 24 on the surface of the static background object 20 or the dynamic foreground object 30 in actual space, in which depth map information is acquired by the depth information acquisition unit 100, the procedure of calibration between the depth information acquisition unit 100 and the display unit 200 arranged in the actual space must be performed in advance as a preprocessing procedure. The preprocessing unit 310 performs calibration between the depth information acquisition unit 100 and the display unit 200, and then calculates an extrinsic parameter required from the standpoint of capturing by the depth information acquisition unit 100 and an intrinsic parameter for the beam projector-type display unit 200. Here, the preprocessing unit 310 may use a calibration process presented in a conventional well-known calibration method between a camera and a projector, or a calibration process to which depth map information is added so that the calibration process is applicable to a depth map-based environment. As calibration between the depth information acquisition unit 100 and the display unit 200 is performed by the preprocessing unit 310, the relative location and direction information between the depth information acquisition unit 100 and the display unit 200 arranged in the actual space may be generated via the analysis of the extrinsic parameter. Based on the relative location and direction information, a view projection matrix for the display unit 200 may be calculated. Accordingly, unless the depth information acquisition unit 100 and the display unit 200, between which calibration has been performed in advance, have separately moved/rotated, the corresponding image content may be accurately projected on the location of the surface of the static background object 20 or the dynamic foreground object 30, the depth image of which has been acquired by the depth information acquisition unit 100 in the actual space, via the display unit 200.

The DB unit 330 previously stores image content including the background image 22 and the object image 24 projected on the static background object 20 or the dynamic foreground object 30 via the display unit 200. The DB unit 330 provides the image content including the background image 22 and the object image 24, which are previously stored, to the object image bounding volume management unit 350, the foreground/background processing unit 370, and the event processing unit 390.

Figure 3:
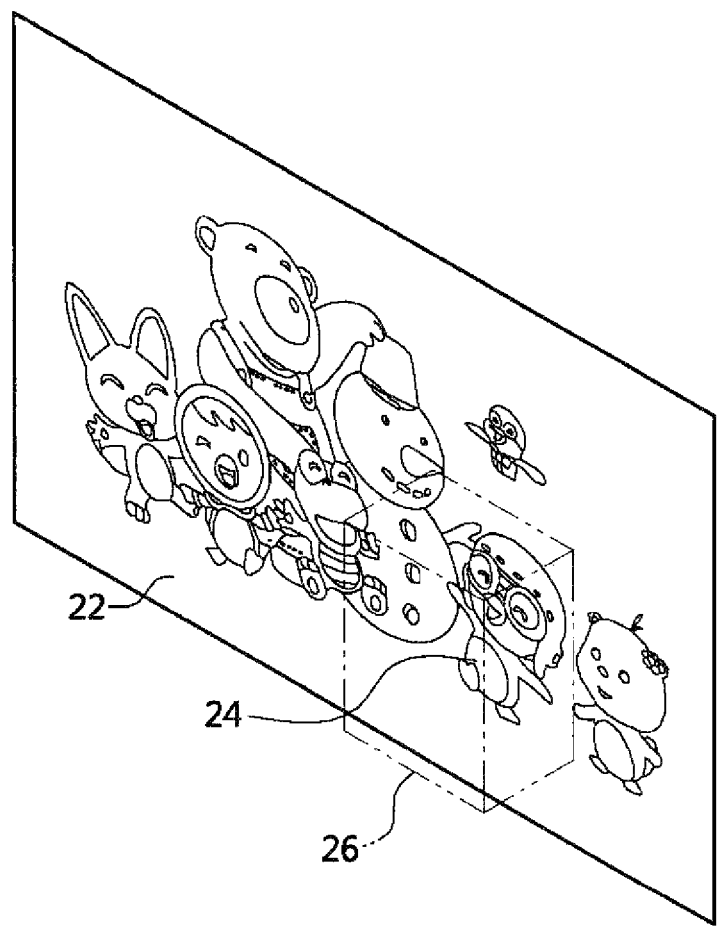
FIG. 3 is a diagram showing an object image bounding volume, set and managed by the object image bounding volume management unit shown in FIG. 2.

The object image bounding volume management unit 350 sets and manages an object image bounding volume 26 including the object image 24 in the foreground direction of the object image 24 projected on the static background object 20. More specifically, referring to FIG. 3, the object image bounding volume management unit 350 sets and manages a bounding volume in the foreground direction so as to sense a collision between the dynamic foreground object 30 and the object image 24, which may be transferred to and projected on the foreground, among pieces of image content projected on the static background object 20. Here, the object image bounding volume management unit 350 preferably sets the size of the bounding volume 26 of the object image 24 rendered and projected on the static background object 20 to a size that includes both the physical sizes of the object image 24 and the dynamic foreground object 30 in consideration of the size of the object image 24 and the physical size of the dynamic foreground object 30. Alternatively, the object image bounding volume 26 set by the object image bounding volume management unit 350 is designated to protrude from the 2D plane of the surface of the static background object 20 in the foreground direction by a preset bounding depth value $D_b$. As will be described later, when the dynamic foreground object 30 is moved in the foreground direction within the bounding volume 26 allocated to each object image 24, switching between the foreground and background of the object image 24 is performed.

The foreground/background processing unit 370 determines whether the dynamic foreground object 30 collides with the bounding volume 26 of the object image 24, set by the object image bounding volume management unit 350, depending on the depth maps based on the depth values of the static background object 20 and the dynamic foreground object 30 calculated by the depth information acquisition unit 100. If it is determined that the dynamic foreground object 30 collides with the object image bounding volume 26, the foreground/background processing unit 370 controls the display unit 200 such that the object image 24 projected on the surface of the static background object 20 is transferred to and projected on the surface of the dynamic foreground object 30. For this operation, as shown in FIG. 2, the foreground/background processing unit 370 includes a foreground object recognition unit 372, a foreground object bounding volume setting unit 374, a bounding volume collision determination unit 376, and a foreground/background switching unit 378.

The foreground object recognition unit 372 recognizes the location and movement direction of the dynamic foreground object 30, using the depth maps based on the depth values calculated by the depth information acquisition unit 100. More specifically, by using the depth maps based on the depth values of the static background object 20 and the dynamic foreground object 30, which are acquired by the depth information acquisition unit 100, the foreground object recognition unit 372 recognizes the location and movement direction of the dynamic foreground object 30 that is present in the foreground direction of the static background object 20, and generates information about the recognized location and movement direction of the dynamic foreground object 30. For this operation, the foreground object recognition unit 372 previously acquires and stores a depth map based on the depth value of the static background object 20, which is obtained when no dynamic foreground object 30 is present, through the use of the depth information acquisition unit 100. Further, when a dynamic foreground object 30 is present and then depth values that differ from the depth value of the static background object 20 by a preset threshold depth value (D) or more are detected, the foreground object recognition unit 372 groups neighboring depth values among the depth values (grouping), and classifies the grouped neighboring depth values as individual blobs. The foreground object recognition unit 372 may be configured to, when the size of each classified blob is less than or equal to a preset minimum size $S_{min}$ or is equal to or greater than a preset maximum size $S_{max}$, exclude the corresponding blob, and only when the size of the classified blob falls within a preset range, recognize the location and movement direction of the corresponding dynamic foreground object 30. Further, for the depth map based on the depth value of the static background object 20, obtained when no dynamic foreground object 30 is present, the foreground object recognition unit 372 sets a width corresponding to a preset range in the outer region of the depth map using the depth information acquisition unit 100. If the blob extends into the width, the foreground object recognition unit 372 may be configured to exclude the blob, thus preventing the location and movement direction of the dynamic foreground object 30 corresponding to the blob from being recognized. The reason for this is that the blob related to the body of the user, which ranges in the foreground direction of the static background object 20, is an unnecessary blob, and the entire blob is intended to be excluded. Meanwhile, when the shape or, size of the dynamic foreground object 30 is pre-designated, the foreground object recognition unit 372 may store template information about the shape or size of the corresponding dynamic foreground object 30. In this case, as the size of the dynamic foreground object 30, the size in a 3D world coordinate system is used. In this regard, the foreground object recognition unit 372 compares the shape or size of each classified blob with the pre-stored template of the dynamic foreground object 30, based on the pre-stored template information of the dynamic foreground object 30, and may recognize the presence of the dynamic foreground object 30 if the result of the comparison exhibits a similarity (S %) of a predetermined value or more. In order to reduce the computational load on the foreground object recognition unit 372 attributable to the process of comparing the classified blob with the pre-stored template of the dynamic foreground object 30, the foreground object recognition unit 372 sets and maintains a specific ID for the dynamic foreground object 30 that was recognized once, without recognizing again the corresponding dynamic foreground object 30, unless the location and bounding volume of the dynamic foreground object 30 are suddenly changed. That is, when a specific object is recognized from the surrounding region located at a threshold distance or, less from the previous location of the dynamic foreground object 30 that was recognized once, and the shape or size of the blob calculated for the corresponding object has a similarity (S %_1, which is less than S %) of a predetermined value or more to the template of the dynamic foreground object 30, the foreground object recognition unit 372 recognizes the blob as the blob of the existing dynamic foreground object 30. For the dynamic foreground object 30, which is recognized by the foreground object recognition unit 372 and for which a specific ID has been set, the location and movement direction of the dynamic foreground object 30 are tracked by the foreground object tracking unit 392 of the event processing unit 390, which will be described later. Further, there may occur the case where, as an incomplete depth value is acquired by the depth information acquisition unit 100, the foreground object recognition unit 372 may not recognize the blob of a moving dynamic foreground object 30 when the dynamic foreground object 30 is moving. To prevent such a recognition error, when the dynamic foreground object 30 disappears from the foreground of the static background object 20 and is then recognized at a neighboring location within a predetermined period of time, the foreground object recognition unit 372 preferably recognizes that the dynamic foreground object 30 having the same ID is continuously present in the foreground direction of the static background object 20, and has not disappeared.

The foreground object bounding volume setting unit 374 sets a bounding volume (foreground object bounding volume) having a size including a predetermined portion or more of the corresponding dynamic foreground object 30, for the dynamic foreground object 30 recognized by the foreground object recognition unit 372, and manages the bounding volume.

The bounding volume collision determination unit 376 determines whether the bounding volume (object image bounding volume 26) of the object image 24, which is set and managed by the object image bounding volume management unit 350, has collided with the bounding volume (foreground object bounding volume) of the dynamic foreground object 30, which is set by the foreground object bounding volume setting unit 374. In greater detail, when the object image bounding volume 26 overlaps the foreground object bounding volume by a preset threshold value or more, and the movement direction of the dynamic foreground object 30 is the foreground direction, the bounding volume collision determination unit 376 determines that the dynamic foreground object 30 has collided with the object image bounding volume 26. Here, the collision check method by which the bounding volume collision determination unit 376 checks for a collision between the object image bounding volume 26 and the foreground object bounding volume may be implemented using a conventional well-known collision check algorithm for covering various shapes (box shape, cylinder shape, spherical shape, mesh shape, etc.). When the object image 24 is moving in the background image 22, the bounding volume collision determination unit 376 calculates the location at which the object image 24 is projected on the static background object 20 via a projection matrix, and converts the location into a world coordinate bounding volume appearing when the depth information acquisition unit 100 faces the object image 24. When the object image passes through the projection matrix, the coordinates (between −1 and 1) of the corresponding center bounding volume are obtained. When a projection mapping algorithm is applied to the coordinates, world coordinates may be known. Since the dynamic foreground object 30 has already been represented by the world coordinates based on the depth information acquisition unit 100, it is determined based on the world coordinates whether the dynamic foreground object 30 collides with the bounding volume 26 of the object image 24 while the bounding volume of the dynamic foreground object 30 is being tracked.

Figure 4A:
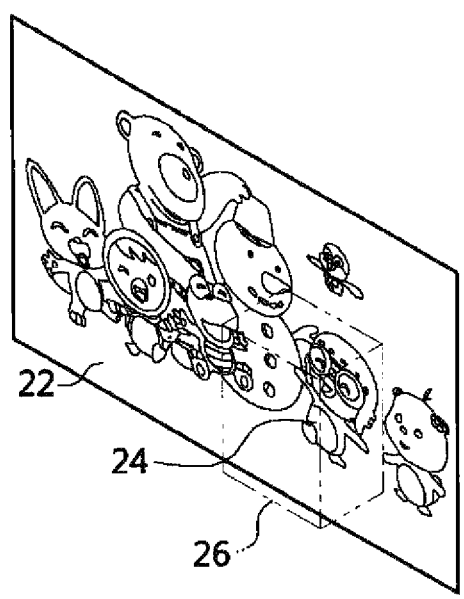
FIGS. 4A, 4B and 4C are diagrams showing the procedure of allowing the foreground/background switching unit shown in FIG. 2 to transfer and project an object image, projected on the surface of a static background object, to and on the surface of a dynamic foreground object.
Figure 4B:
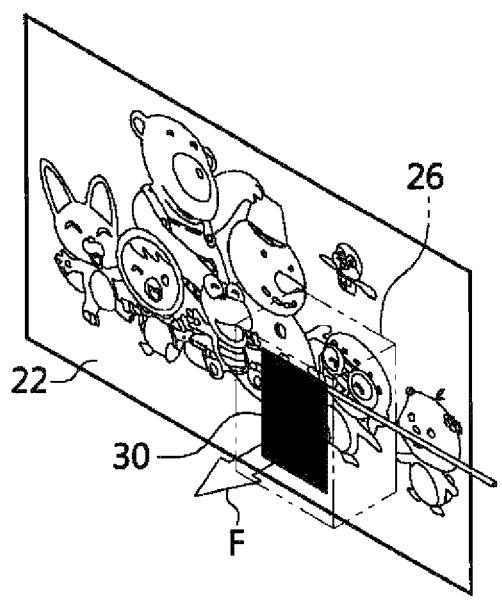
Figure 4C:
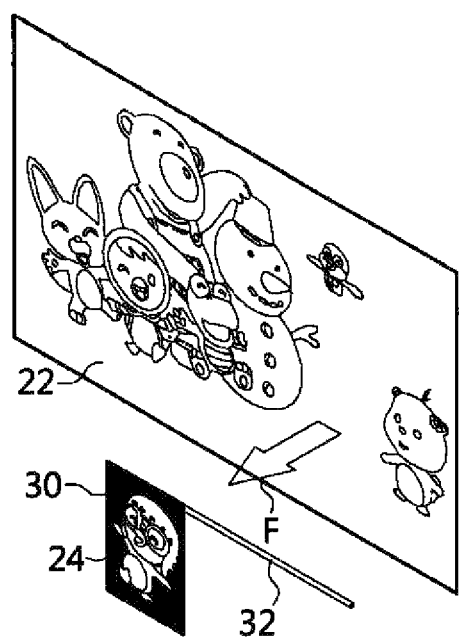

If it is determined by the bounding volume collision determination unit 376 that the dynamic foreground object 30 collides with the object image bounding volume 26, the foreground/background switching unit 378 controls the display unit 200 so that the object image 24 projected on the surface of the static background object 20 is transferred to and projected on the surface of the dynamic foreground object 30. Referring to FIG. 4A, an object image 24 is projected, together with a background image 22, on a static background object 20, and an object image bounding volume 26 is set in the foreground direction of the object image 24 and managed by the object image bounding volume management unit 350. Here, FIG. 4B, a dynamic foreground object 30 attached to a transparent acrylic handle 32 by the user is located in the foreground direction of the object image 20. As a result, when the movement direction of the dynamic foreground object 30 is the foreground direction (F) of the static background object 20 (when the dynamic foreground object collides with the object image bounding volume) while the object image bounding volume 26 and the bounding volume of the foreground object 30 overlap each other by a predetermined threshold or more, the foreground/background switching unit 378 controls the display unit 200 so that the object image 24 projected on the surface of the static background object 20 is transferred to and projected on the surface of the dynamic foreground object 30, as shown in FIG. 4C. Further, when it is recognized by the foreground object recognition unit 372 that the dynamic foreground object 30, to which the object image 24 is transferred and on which it is projected, deviates from the foreground direction of the static background object 20, the foreground/background switching unit 378 controls the display unit 200 so that the object image 24, transferred to and projected on the surface of the dynamic foreground object 30, is re-transferred to and re-projected on the surface of the static background object 20. Meanwhile, when the object image 24 projected on the surface of the static background object 20 is transferred to and projected on the surface of the dynamic foreground object 30 by controlling the display unit 200, the foreground/background switching unit 378 excludes the object image 24 from the background image 22, and performs projection mapping on a render target texture, which is separately provided for the object image 24, after the size of the render target texture is scaled in accordance with the size of the bounding volume relative to the surface mesh of the dynamic foreground object 30.

The event processing unit 390 tracks the movement of the dynamic foreground object 30 in the foreground direction of the static background object 20, depending on the depth maps based on the depth values of the static background object 20 and the dynamic foreground object 30, which are calculated by the depth information acquisition unit 100. The event processing unit 390 is configured such that, as the dynamic foreground object 30 is moving, the object image 24 continues to be projected on the surface of the moving dynamic foreground object 30 by controlling the display unit 200, and such that, with the movement of the dynamic foreground object 30, the animation effect of the object image 24, projected on the surface of the dynamic foreground object 30, is changed, or alternatively the content of the background image 22 projected on the surface of the static background object 20 is changed. For this operation, as shown in FIG. 2, the event processing unit 390 includes a foreground object tracking unit 392, an object image animation processing unit 394, and a background image content processing unit 396.

The foreground object tracking unit 392 tracks the location and movement direction of the dynamic foreground object 30, which is present in the foreground direction of the static background object 20, using the depth map based on the depth values of the dynamic foreground object 30 calculated by the depth information acquisition unit 100. Further, the foreground object tracking unit 392 transmits information about the tracked location and movement direction of the dynamic foreground object 30, that is, the movement information of the dynamic foreground object 30, to the object image animation processing unit 394 or to the background image content processing unit 396. Here, the foreground object tracking unit 392 may be integrated with the above-described foreground object recognition unit 374 into a single module. Meanwhile, due to an error in depth recognition by the depth information acquisition unit 100, large shaking occurs in the dynamic foreground object 30, the location and movement direction of which are being tracked by the foreground object tracking unit 392. Such a shaking phenomenon occurs due to the error in the depth recognition of the depth information acquisition unit 100 within the range less than the motion of the actual dynamic foreground object 30. The shaking phenomenon produces micro-vibrations at very short time intervals, and thus the object image 24 projected by the display unit 200 seems to be unstable from the standpoint of the user. Therefore, to cancel image noise attributable to the micro vibrations, the foreground object tracking unit 392 removes the shaking of the object image 24, which is projected on the surface of the dynamic foreground object 30, through the application of Kalman filters. Here, the foreground object tracking unit 392 separately applies respective Kalman filters to six parameters corresponding to the tracked location (x, y, z) and the rotation ($R_x$, $R_y$, $R_z$) of the dynamic foreground object 30. When Kalman filter values are adjusted to be excessively smooth, the motion of the object image 24 is smoothened, but a disadvantage arises in that the movement reacts late to variation in the motion of the dynamic foreground object 30. Thus, it is preferable that the foreground object tracking unit 392 suitably adjust Kalman filter values to a level at which it is possible to remove image shaking alone.

The object image animation processing unit 394 changes the animation effect of the object image 24 that is projected on the surface of the dynamic foreground object 30 depending on the movement information of the dynamic foreground object 30 tracked by the foreground object tracking unit 392. More specifically, the object image animation processing unit 394 calculates the respective movement values of the dynamic foreground object 30 in X/Y/Z axis directions from the motion information of the dynamic foreground object 30, and changes the animation effect of the object image 24 depending on the movement direction and velocity of the corresponding dynamic foreground object 30. For example, when the object image 24 is assumed to be a human/animal character, the object image animation processing unit 394 changes the animation effect of the object image 24 so that, when the dynamic foreground object 30 moves upwards, the human/animal character jumps, and when the dynamic foreground object 30 moves downwards, the human/animal character falls down, sits down, or, lies down flat, and so that, when the dynamic foreground object 30 moves to the left/right, the human/animal character walks or runs to the left/right. Here, the animation effect by which the human/animal character walks or runs may be identified depending on the movement velocity of the dynamic foreground object 30 to the left/right in such a way that, when the movement velocity is equal to or greater than a threshold velocity $V_r$, the animation indicates the action of running to the left/right, and when the movement velocity is less than the threshold velocity, the animation indicates the action of walking to the left/right. Furthermore, the object image animation processing unit 394 may change the animation effect of the object image 24 so that, when the dynamic foreground object 30 moves forwards/backwards with respect to the foreground direction of the static background object, the human/animal character walks or runs forwards/backwards. Furthermore, the object image animation processing unit 394 may change the animation effect of the object image 24 so that, even when the dynamic foreground object 30 changes its direction (upon rotating), the human/animal character falls forwards if the dynamic foreground object 30 leans forwards, and the human/animal character falls backwards if the dynamic foreground object 30 leans backwards. When the object image 24 corresponds to an inanimate thing, the object image animation processing unit 394 may cause a feedback effect by changing the animation effect of the object image 24. For example, when the object image 24 is an image of a water bottle filled with water, the object image animation processing unit 394 may change the animation effect of the object image 24 in the form of a fluid physics simulation, such as the slopping of water in the bottle depending on the motion of the dynamic foreground object 30.

The background image content processing unit 396 changes the content displayed as the background image 22 projected on the surface of the static background object 20 depending on the movement information of the dynamic foreground object 30 tracked by the foreground object tracking unit 392. For example, when the background image 22 is assumed to be a door, the background image content processing unit 396 may set and manage the bounding volume of the door, which corresponds to the background image 22, and may change the content of the background image 20 so that, when the dynamic foreground object 30, on which a key-shaped object image 24 is projected, collides with the bounding volume of the door, the door opens.

Hereinafter, an interactive content control method according to the present invention will be described with reference to the attached drawings. Repeated descriptions of some configurations overlapping the operation of the interactive content control apparatus according to the present invention, which has been described with reference to FIGS. 1 to 4A, 4B and 4C, will, be omitted.

Figure 5:
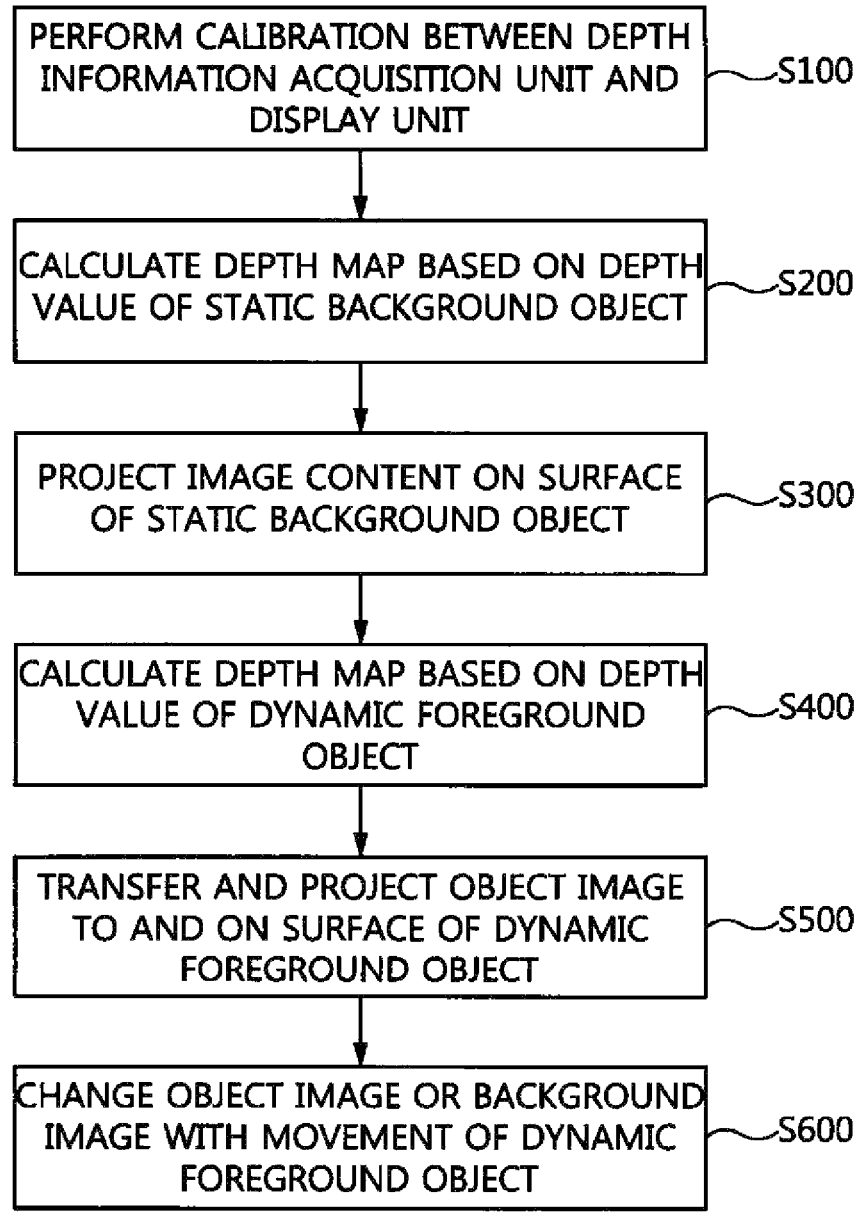
FIG. 5 is a flowchart showing an interactive content control method according to the present invention.

FIG. 5 is a flowchart showing an, interactive content control method according to the present invention.

Referring to FIG. 5, in the interactive content control method according to the present invention, the preprocessing unit 310 of the image mapping unit 300 calculates an extrinsic parameter of the depth information acquisition unit 100 and an intrinsic parameter of the display unit 200, generates information about the relative location and direction between the depth information acquisition unit 100 and the display unit 200, and performs calibration between the depth information acquisition unit 100 and the display unit 200 at step S100.

Next, the depth information acquisition unit 100 acquires an image that includes depth information by capturing a static background object 20, and calculates a depth map based on the depth value of the static background object 20 from the image at step S200. At step S200, the depth information acquisition unit 100 transmits information about the calculated depth map of the static background object 20 to the image mapping unit 300.

Further, the image mapping unit 300 controls the display unit 200 so that image content including a background image 22 and an object image 24 is projected on the surface of the static background object 20, based on the depth map received from the depth information acquisition unit 100 at step S200, at step S300.

Then, the depth information acquisition unit 100 acquires an image that includes depth information by capturing a dynamic foreground object 30 and calculates a depth map based on the depth value of the dynamic foreground object 30 from the image at step S400. At step S400, the depth information acquisition unit 100 transmits the calculated depth map information of the dynamic foreground object 30 to the image mapping unit 300.

Further, the foreground/background processing unit 370 of the image mapping unit 300 recognizes the dynamic foreground object 30 based on the depth map received from the depth information acquisition unit 100 at step S400, and controls the display unit 200 so that the object image 24 projected on the surface of the static background object 20 is transferred to and projected on the surface of the recognized dynamic foreground object 30 at step S500.

Next, the event processing unit 390 of the image mapping unit 300 tracks the movement of the dynamic foreground object 30 based on the depth map received from the depth information acquisition unit 100 at step S400, and changes the animation effect of the object image 24, which is transferred to and projected on the surface of the dynamic foreground object 30, when the dynamic foreground object 30 is moved, or changes the content of the background image 22, which is projected on the surface of the static background object 20, at step S600.

Figure 6:
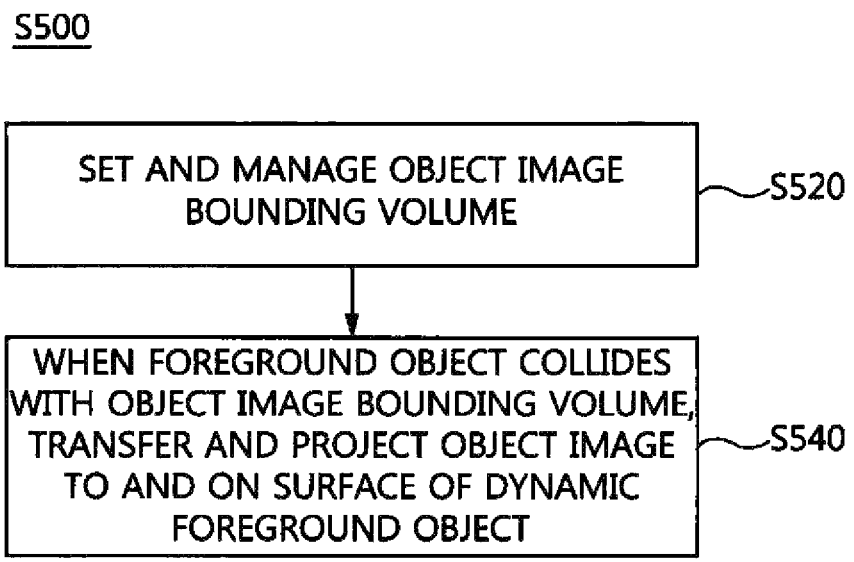
FIG. 6 is a flowchart showing in detail step S500 of the interactive content control method shown in FIG. 5 according to the present invention.

FIG. 6 is a flowchart showing in detail step S500 in the interactive content control method shown in FIG. 5 according to the present invention.

Referring to FIG. 6, at step S500, where the foreground/background processing unit 370 of the image mapping unit 300 recognizes a dynamic foreground object 30 and controls the display unit 200 so that the object image 24 projected on the surface of the static background object 20 is transferred to and projected on the surface of the dynamic foreground object 30, the object image bounding volume management unit 350 of the image mapping unit 300 sets and manages an object image bounding volume 26 including the object image 24 in the foreground direction of the object image 24 projected on the static background object 20 at step S520.

Next, the foreground/background processing unit 370 determines, using the depth maps based on the depth values of the dynamic foreground object 30 received from the depth information acquisition unit 100 at steps S200 and S400, whether the dynamic foreground object 30 collides with the object image bounding volume 26 set by the object image bounding volume management unit 350 at step S520. If it is determined that the object image bounding volume 26 collides with the dynamic foreground object 30, the foreground/background processing unit 370 controls the display unit 200 so that the object image 24, projected on the surface of the static background object 20, is transferred to and projected on the surface of the dynamic foreground object 30 at step S540.

Figure 7:
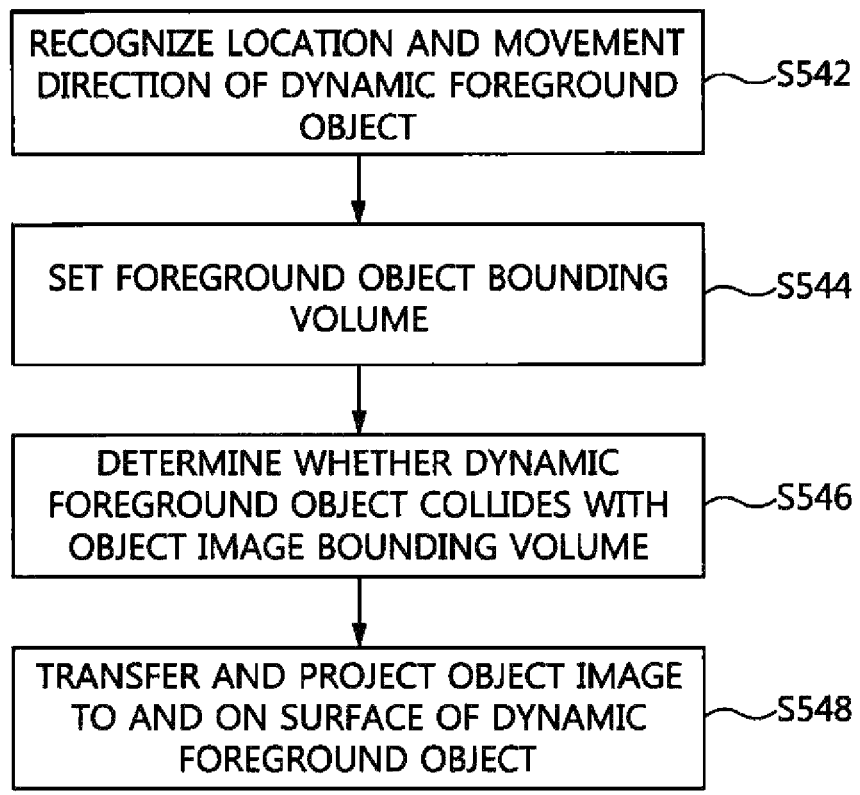
FIG. 7 is a flowchart showing in detail step S540 of the process shown in FIG. 6.

FIG. 7 is a flowchart showing in detail step S540 of the process shown in FIG. 6.

Referring to FIG. 7, at step S540, where the foreground/background processing unit 370 of the image mapping unit 300 transfers the object image 24, which is projected on the surface of the static background object 20, to the surface of the dynamic foreground object 30 and projects the object image 24 on the surface of the dynamic foreground object 30 if the dynamic foreground object 30 collides with the object image bounding volume 26, the foreground object recognition unit 372 of the foreground/background processing unit 370 recognizes the location and movement direction of the dynamic foreground object 30 present in the foreground direction of the static background object 20, depending on the depth maps based on the depth values of the dynamic foreground object 30 received from the depth information acquisition unit 100 at steps S200 and S400, at step S542. Here, at step S542, the foreground object recognition unit 372 may previously acquire and store a depth map based on the depth value of the static background object 20, obtained when no dynamic foreground object 30 is present, via the depth information acquisition unit 100. Further, if depth values that differ from the depth value of the static background object 20 by a preset threshold or more are calculated by the depth information acquisition unit 100 at step S400, the foreground object recognition unit 372 classifies depth values, grouped for neighboring depth values, among the depth values, as individual blobs, and may recognize the location and movement direction of the dynamic foreground object 30 only when the size of each blob falls within a preset range. Further, at step S542, the foreground object recognition unit 372 sets a width corresponding to a preset range in the outer region of the depth map of the static background object 20, obtained when no previously stored dynamic foreground object 30 is present, and may exclude the corresponding blob when the blob extends into the set width. At step S542, the foreground object recognition unit 372 transmits the recognized location and movement direction information of the dynamic foreground object 30 to the foreground object bounding volume setting unit 374.

Next, at step S544, the foreground object bounding volume setting unit 374 sets a foreground object bounding volume, including the dynamic foreground object 30, based on the location and movement direction information of the dynamic foreground object 30 received from the foreground object recognition unit 372 at step S542.

Further, the bounding volume collision determination unit 376 of the foreground/background processing unit 370 determines whether the object image bounding volume 26, set by the object image bounding volume management unit 350 at step S520, overlaps the foreground object bounding volume, set by the foreground object bounding volume setting unit 374 at step S544, by a predetermined threshold or more, and whether the movement direction of the dynamic foreground object is a foreground direction. If it is determined that the object image bounding volume 26 and the foreground object bounding volume overlap each other by the preset threshold or more, and that the movement direction of the dynamic foreground object is the foreground direction, the bounding volume collision determination unit 376 determines that the dynamic foreground object collides with the object image bounding volume 26 at step S546.

Next, if it is determined at step S546 by the bounding volume collision determination unit 376 that the dynamic foreground object collides with the object image bounding volume 26, the foreground/background switching unit 378 of the foreground/background processing unit 370 controls the display unit 200 so that the object image 24 projected on the surface of the static background object 20 is transferred to and projected on the surface of the dynamic foreground object 30 at step S548. Meanwhile, at step S548, if it is recognized at step S542 by the foreground object recognition unit 372 that the dynamic foreground object 30 deviates from the foreground direction of the static background object 20, the foreground/background switching unit 378 controls the display unit 200 so that the object image 24, transferred to and projected on the surface of the dynamic foreground object 30, may be re-transferred to and re-projected on the surface of the static background object 20.

Figure 8:
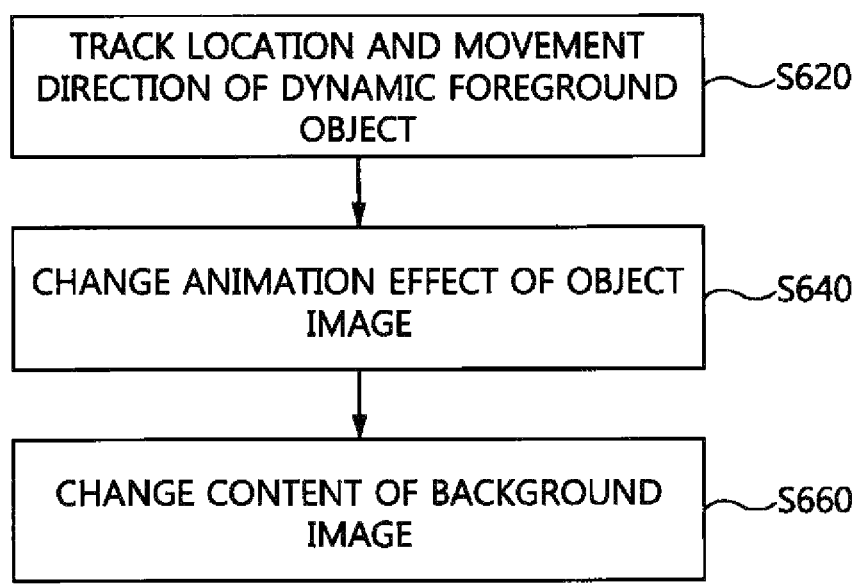
FIG. 8 is a flowchart showing in detail step S600 of the interactive content control method shown in FIG. 5 according to the present invention.

FIG. 8 is a flowchart showing in detail step S600 of the interactive content control method shown in FIG. 5 according to the present invention.

Referring to FIG. 8, at step S600, where the event processing unit 390 of the image mapping unit 300 tracks the movement of the dynamic foreground object 30 and changes the animation effect of the object image 24 transferred to and projected on the surface of the dynamic foreground object 30, or changes the content of the background image 22 projected on the surface of the static background object 20, the foreground object tracking unit 392 of the event processing unit 390 tracks, using the depth map based on the depth value of the dynamic foreground object 30 received from the depth information acquisition unit 100 at step S400, the location and movement direction of the dynamic foreground object 30 present in the foreground direction of the static background object 20 at step S620. At step S620, the foreground object tracking unit 392 transmits the tracked location and movement direction information of the dynamic foreground object 30 to the object image animation processing unit 394 or the background image content processing unit 396.

Then, based on the location and movement direction information of the dynamic foreground object 30 received from the foreground object tracking unit 392 at step S620, the object image animation processing unit 394 changes the animation effect of the object image 24, which is transferred to and projected on the surface of the dynamic foreground object 30, with the movement of the dynamic foreground object 30, at step S640.

Further, at step S660, based on the location and movement direction information of the dynamic foreground object 30 received from the foreground object tracking unit 392 at step S620, the background image content processing unit 396 changes the content of the background image 22, projected on the surface of the static background object 20, with the movement of the dynamic foreground object 30, either simultaneously with step S640 or sequentially to step S640.

In accordance with the present invention, the present invention provides an interactive content control service, in which a user may perform intuitive control compared to a conventional scheme for controlling multimedia content using a keyboard or a mouse, and may switch and render a projection image from a static background object to a dynamic foreground object, so that the user takes a desired object image out of a background image to the foreground by moving a dynamic foreground object in image content having a specific story, thus personally controlling and enjoying multimedia content.

As described above, optimal embodiments of the present invention have been disclosed in the drawings and the specification. Although specific terms have been used in the present specification, these are merely intended to describe the present invention, and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An interactive content control apparatus, comprising:
   a depth information acquisition unit for acquiring an image that includes depth information by capturing a static background object and a dynamic foreground object, and for calculating depth maps based on respective depth values of the static background object and the dynamic foreground object from the image;
   a display unit for projecting image content including both a background image and an object image on a surface of the static background object captured by the depth information acquisition unit; and
   an image mapping unit for recognizing the dynamic foreground object depending on the depth maps based on the depth values calculated by the depth information acquisition unit, and controlling the display unit so that an object image projected on the surface of the static background object is transferred to and projected on a surface of the dynamic foreground object,
   wherein the image mapping unit comprises:
   an object image bounding volume management unit for setting and managing an object image bounding volume including the object image in a foreground direction of the object image projected on the static background object; and
   a foreground/background processing unit for, if, depending on the depth maps based on the depth values calculated by the depth information acquisition unit, the dynamic foreground object is determined to collide with the object image bounding volume, controlling the display unit so that the object image projected on the surface of the static background object is transferred to and projected on the surface of the dynamic foreground object,
   wherein the foreground/background processing unit comprises:
   a foreground object recognition unit for recognizing a location and movement direction of a dynamic foreground object present in the foreground direction of the static background object, depending on the depth maps based on the depth values calculated by the depth information acquisition unit;
   a foreground object bounding volume setting unit for setting a foreground object bounding volume including the dynamic foreground object recognized by the foreground object recognition unit;
   a bounding volume collision determination unit for, if the object image bounding volume and the foreground object bounding volume overlap each other by a preset threshold or more, and if the movement direction of the dynamic foreground object is the foreground direction, determining that the dynamic foreground object collides with the object image bounding volume; and
   a foreground/background switching unit for, if it is determined by the bounding volume collision determination unit that the dynamic foreground object collides with the object image bounding volume, controlling the display unit so that the object image projected on the surface of the static background object is transferred to and projected on the surface of the dynamic foreground object.

2. The interactive content control apparatus of claim 1, wherein the foreground object recognition unit is configured to previously acquire a depth map based on a depth value of the static background object obtained when no dynamic foreground object is present, and is configured to, if depth values that differ from the depth value of the static background object by a preset threshold or more are calculated by the depth information acquisition unit, classify depth values, grouped for neighboring depth values, among the depth values, as individual blobs, and recognize a location and a movement direction of the dynamic foreground object only when a size of each blob falls within a preset range.

3. The interactive content control apparatus of claim 2, wherein the foreground object recognition unit sets a width corresponding to a preset range in an outer region of the depth map based on the depth value of the static background object obtained when no dynamic foreground object is present, and excludes a blob if the blob extends into the width.

4. The interactive content control apparatus of claim 3, wherein the foreground/background switching unit is configured to, if it is recognized by the foreground object recognition unit that the dynamic foreground object deviates from the foreground direction of the static background object, control the display unit so that the object image transferred to and projected on the surface of the dynamic foreground object is projected on the surface of the static background object.

5. The interactive content control apparatus of claim 1, wherein the image mapping unit further comprises an event processing unit configured to, when the dynamic foreground object is moved, change an animation effect of the object image transferred to and projected on the surface of the dynamic foreground object, or change content of the background image projected on the surface of the static background object, depending on the depth maps based on the depth values calculated by the depth information acquisition unit.

6. The interactive content control apparatus of claim 5, wherein the event processing unit comprises:
   a foreground object tracking unit for tracking a location and a movement direction of the dynamic foreground object present in the foreground direction of the static background object, depending on the depth maps based on the depth values calculated by the depth information acquisition unit; and
   an object image animation processing unit for, as the dynamic foreground object tracked by the foreground object tracking unit is moved, changing the animation effect of the object image transferred to and projected on the surface of the dynamic foreground object.

7. The interactive content control apparatus of claim 6, wherein the event processing unit further comprises a background image content processing unit for, as the dynamic foreground object tracked by the foreground object tracking unit is moved, changing the content of the background image projected on the surface of the static background object.

8. The interactive content control apparatus of claim 1, wherein the image mapping unit further comprises a preprocessing unit for calculating an extrinsic parameter of the depth information acquisition unit and an intrinsic parameter of the display unit, generating relative location and direction information, and performing calibration between the depth information acquisition unit and the display unit.

9. An interactive content control method, comprising:
acquiring, by a depth information acquisition unit, an image that includes depth information by capturing a static background object, and calculating a depth map based on a depth value of the static background object from the image;
projecting, by an image mapping unit, image content including both a background image and an object image on a surface of the static background object depending on the depth map by controlling a display unit, the depth map being based on the depth value of the static background object calculated by a depth information acquisition unit;
acquiring, by the depth information acquisition unit, an image that includes depth information by capturing a dynamic foreground object, and calculating a depth map based on a depth value of the dynamic foreground object from the image; and
recognizing, by the image mapping unit, the dynamic foreground object depending on the depth map based on the depth value of the dynamic foreground object calculated by the depth information acquisition unit, and transferring and projecting the object image projected on the surface of the static background object to and on a surface of the dynamic foreground object by controlling the display unit,
wherein transferring and projecting the object image projected on the surface of the static background object to and on the surface of the dynamic foreground object comprises:
setting and managing, by an object image bounding volume management unit, an object image bounding volume including the object image in a foreground direction of the object image projected on the static background object; and
transferring and projecting the object image projected on the surface of the static background object to and on the surface of the dynamic foreground object by controlling the display unit if, depending on the depth maps based on the depth values calculated by the depth information acquisition unit, the dynamic foreground object is determined to collide with the object image bounding volume,
wherein transferring and projecting the object image projected on the surface of the static background object to and on the surface of the dynamic foreground object if the dynamic foreground object is determined to collide with the object image bounding volume, comprises:
recognizing, by a foreground object recognition unit, a location and a movement direction of the dynamic foreground object present in the foreground direction of the static background object depending on the depth maps based on the depth values calculated by the depth information acquisition unit;
setting, by a foreground object bounding volume setting unit, a foreground object bounding volume including the dynamic foreground object recognized by the foreground object recognition unit;
if the object image bounding volume and the foreground object bounding volume overlap each other by a preset threshold or more, and the movement direction of the dynamic foreground object is the foreground direction, determining that the dynamic foreground object collides with the object image bounding volume; and
if it is determined by the bounding volume collision determination unit that the dynamic foreground object collides with the object image bounding volume, transferring and projecting, by a foreground/background switching unit, the object image projected on the surface of the static background object to and on the surface of the dynamic foreground object, by controlling the display unit.

10. The interactive content control method of claim 9, wherein recognizing the location and movement direction of the dynamic foreground object present in the foreground direction of the static background object comprises:
previously acquiring a depth map based on a depth value of the static background object obtained when no dynamic foreground object is present; and
if depth values that differ from the depth value of the static background object by a preset threshold or more are calculated by the depth information acquisition unit, classifying depth values, grouped for neighboring depth values, among the depth values, as individual blobs, and recognizing a location and a movement direction of the dynamic foreground object only when a size of each blob falls within a preset range.

11. The interactive content control method of claim 10, wherein recognizing the location and movement direction of the dynamic foreground object present in the foreground direction of the static background object further comprises:
setting a width corresponding to a preset range in an outer region of the depth map based on the depth value of the static background object obtained when no dynamic foreground object is present, and excluding a blob if the blob extends into the width.

12. The interactive content control method of claim 11, wherein transferring and projecting the object image projected on the surface of the static background object to and on the surface of the dynamic foreground object if it is determined by the bounding volume collision determination unit that the dynamic foreground object collides with the object image bounding volume, comprises:
if it is recognized by the foreground object recognition unit that the dynamic foreground object deviates from the foreground direction of the static background object upon recognizing the location and movement direction of the dynamic foreground object, controlling the display unit so that the object image transferred to and projected on the surface of the dynamic foreground object is projected on the surface of the static background object.

13. The interactive content control method of claim 9, further comprising changing, by an event processing unit, an animation effect of the object image transferred to and projected on the surface of the dynamic foreground object, or changing content of the background image projected on the surface of the static background object when the dynamic foreground object is moved, depending on the depth maps based on the depth values calculated by the depth information acquisition unit.

14. The interactive content control method of claim 13, wherein changing the animation effect of the object image transferred to and projected on the surface of the dynamic foreground object, or changing the content of the background image projected on the surface of the static background object comprises:

tracking, by a foreground object tracking unit, a location and a movement direction of the dynamic foreground object present in the foreground direction of the static background object, depending on the depth maps based on the depth values calculated by the depth information acquisition unit; and as the dynamic foreground object tracked by the foreground object tracking unit is moved, changing, by an object image animation processing unit, the animation effect of the object image transferred to and projected on the surface of the dynamic foreground object.

15. The interactive content control method of claim 14, wherein changing the animation effect of the object image transferred to and projected on the surface of the dynamic foreground object, or changing the content of the background image projected on the surface of the static background object further comprises:

as the dynamic foreground object tracked by the foreground object tracking unit is moved, changing, by a background image content processing unit, the content of the background image projected on the surface of the static background object.

16. The interactive content control method of claim 9, further comprising, before acquiring the image including depth information by capturing the static background object, and calculating the depth map based on the depth value of the static background object from the image:

calculating, by a preprocessing unit, an extrinsic parameter of the depth information acquisition unit and an intrinsic parameter of the display unit, generating relative location and direction information, and performing calibration between the depth information acquisition unit and the display unit.

* * * * *